United States Patent
Barlett et al.

(10) Patent No.: US 10,540,662 B2
(45) Date of Patent: Jan. 21, 2020

(54) FILE SYSTEM COMPLIANCE CHECKING

(71) Applicant: International Business Machines Corporation, Armonk, NY (US)

(72) Inventors: Douglas M. Barlett, Rochester, NY (US); Yixin Diao, White Plains, NY (US); Harish Dindigal, Parlin, NJ (US); Robert Filepp, Westport, CT (US); Bo Forsberg, Västerås (SE); Lakshminarayanan Renganarayana, Hartsdale, NY (US); Xiaolan Zhang, Chappaqua, NY (US)

(73) Assignee: International Business Machines Corporation, Armonk, NY (US)

(*) Notice: Subject to any disclaimer, the term of this patent is extended or adjusted under 35 U.S.C. 154(b) by 824 days.

(21) Appl. No.: 14/500,213

(22) Filed: Sep. 29, 2014

(65) Prior Publication Data

US 2016/0092686 A1  Mar. 31, 2016

(51) Int. Cl.
*G06Q 30/00* (2012.01)

(52) U.S. Cl.
CPC ..... *G06Q 30/018* (2013.01); *G06F 2221/034* (2013.01)

(58) Field of Classification Search
None
See application file for complete search history.

(56) References Cited

U.S. PATENT DOCUMENTS

| | | | | |
|---|---|---|---|---|
| 2007/0130320 A1* | 6/2007 | Morgan | ............. | G06F 11/3636 709/224 |
| 2009/0019447 A1* | 1/2009 | Hellerstein | ........... | G06F 9/4843 718/104 |
| 2012/0054731 A1* | 3/2012 | Aravamudan | ............ | G06F 8/63 717/170 |
| 2013/0085986 A1* | 4/2013 | Burger | .................... | G06F 9/505 707/609 |
| 2013/0219176 A1* | 8/2013 | Akella | ................ | H04L 63/0815 713/165 |
| 2014/0082621 A1* | 3/2014 | Fitzgerald | ........... | G06F 9/45533 718/1 |

OTHER PUBLICATIONS

Martin Streicher, Monitor file system activity with inotify, http://www.ibm.com/developerworks/linux/library/l-ubuntu-inotify/l-ubuntu-inotify-pdf.pdf, pp. 1-10, Sep. 16, 2008.
EMC2, File System Auditing with EMC Isilon, EMC Common Event Enabler, and Varonis DatAdvantage, Apr. 2014, pp. 1-15.

* cited by examiner

*Primary Examiner* — Kris E Mackes
*Assistant Examiner* — Soheila (Gina) Davanlou
(74) *Attorney, Agent, or Firm* — Kristofer Haggerty; Otterstedt, Wallace & Kammer, LLP

(57) ABSTRACT

A method of checking file system compliance including receiving a plurality of compliance rules corresponding to a file system of a production system, collecting, by a collector, file system meta data from the file system, analyzing, by an analyzer, the file system meta data using the plurality of compliance rules to determine at least one compliance deviation of the file system, and throttling the collector and the analyzer independently of one-another, wherein the collector and the analyzer are configured according to a model of performance for the production system and a schedule for the collection and analyzing.

13 Claims, 10 Drawing Sheets

```
throttled_collect(sleep_time, num_nodes):
  while (inodes_left()):
    scan_filesystem(num_nodes)
    sleep(sleep_time)
```

FIG. 3

```
drwxr-xr-x  5 perfmgr perfmgr   512 Tue Jun 10 15:24:14 2008 /home/perfmgr
drwx------  2 perfmgr perfmgr   512 Tue Jun 10 15:01:58 2008 /home/perfmgr/.ssh
-rw-------  1 perfmgr perfmgr  4856 Tue Jun 10 15:31:34 2008 /home/perfmgr/.ssh/authorized_keys
-rwxrwxrwx  1 perfmgr perfmgr 30720 Tue Jun 10 15:11:10 2008 /home/perfmgr/SrmDsaKeys-1.0.tar
-rw-rwxrwx  1 perfmgr perfmgr  1838 Fri Nov 15 14:30:09 2002 /home/perfmgr/README.INSTALL
drwxrwx---  2 perfmgr perfmgr   512 Fri Nov 15 14:30:09 2002 /home/perfmgr/openssh
-rw-rwx---  1 perfmgr perfmgr  1510 Fri Nov 15 14:30:17 2002 /home/perfmgr/openssh/READ.OPENSSH.WINTEL
-rw-rwx---  1 perfmgr perfmgr  1305 Fri Nov 15 14:30:17 2002 /home/perfmgr/openssh/README.OPENSSH.UNIX
-rw-rwx---  1 perfmgr perfmgr  2428 Fri Nov 15 14:30:17 2002 /home/perfmgr/openssh/srm.openssh.pub
drwxrwx---  2 perfmgr perfmgr   512 Fri Nov 22 12:39:35 2002 /home/perfmgr/secsh
```

```
ln. 1  Input: pauseSecs - seconds to sleep
    2     numObjects - number of files/dirs to visit between sleeps
    3     dir - starting directory
    4     skipRules - rules to skip files / dirs 5  Output: file system meta-data (lstat) for files and directories 6  walk_dir(pauseSecs, numObjects, dir, skipRules)
    7        return if skipDir(dir, skipRules) // check to skip or not
    8        // test permissions and store in stack
    9    testDirPermissions(dir, skipRules)
   10        for each child c of dir
   11             path = dir+"/" c
   12             printstat(path) // format and print meta-data for path
   13             // sleep if we have scanned numObjects since last sleep
   14    n = n + 1
   15             if n % numObjects == 0
   16                  sleep(pauseSecs)
   17             // recursively explore all dirs and files
   18        if path is a directory:
   19                  walkdir(pauseSecs, numObjects, path, skipRules)
```

FILE SYSTEM COMPLIANCE CHECKING

BACKGROUND

The present disclosure relates to file system compliance checking, and more particularly a method for scanning a file system using feedforward profiling and scheduling with feedback for individual and adaptive throttling.

Security compliance rules are defined to keep systems secure. Hosting services/ops center providers must guarantee compliance to rules in order to meet contractual obligations. To ensure compliance, a (full) file system scan and analysis must be conducted, and violations must be remediated in a timely fashion.

Existing approaches to file system scanning use a monolithic architecture where scanning and checking are intermixed in same scripts with limited control on performance perturbation in the production system. For example, a checking operation can occupy locks on file inodes preventing other software (in particular client business applications) from accessing the same files. As a result, only partial scanning is possible leading to undetected violations.

BRIEF SUMMARY

According to an exemplary embodiment of the present disclosure, a method of checking file system compliance including receiving a plurality of compliance rules corresponding to a file system of a production system, collecting, by a collector, file system meta data from the file system, analyzing, by an analyzer, the file system meta data using the plurality of compliance rules to determine at least one compliance deviation of the file system, and throttling the collector and the analyzer independently of one-another, wherein the collector and the analyzer are configured according to a model of performance for the production system and a schedule for the collection and analyzing.

BRIEF DESCRIPTION OF THE SEVERAL VIEWS OF THE DRAWINGS

Preferred embodiments of the present disclosure will be described below in more detail, with reference to the accompanying drawings:

FIG. 3 is an exemplary snippet of file meta-data for a file system according to an exemplary embodiment of the present disclosure;

FIG. 7 is an exemplary routine for performing a collector method according to an exemplary embodiment of the present disclosure;

DETAILED DESCRIPTION

According to an embodiment of the present invention, a file system scan is enabled using a split detector architecture having functionally distinct collector and analyzer components. Within given Service Level Objectives (e.g., limits on disk and processor utilization), the file system scan generates meta-data for each file and analyzes them against compliance rules.

In the UNIX operating environment, file access permissions can be set to allow any logged-in user access to modify one or more files or directories, creating a risk of unauthorized access, modification or disclosure of the information contained in the file or directory.

According to an exemplary embodiment of the present invention, to detect files that allow improper file permissions, such as a world write access (i.e., privileges granted to all users) in certain cases, the collector gathers the permission data and the analyzer applies a set of access rules to the results gathered by the collector. In certain cases, otherwise improper file permissions can be required by a design of a software product, and in these cases the access rules are updated to include information on valid exceptions to the rules so that the file access should not be modified and should not be analyzed further. Files or directories that violate one or more of the access rules cannot automatically be deemed to be invalid because there are new situations and products that can warrant an exception. The output of the analyzer is a list of files and directories that need to be evaluated further to determine which of them have no valid business requirement for otherwise improper access. In those cases, the access permissions on the file or directory are changed to align with the appropriately level of file access. In some cases, the analyzer's output includes a list of files and directories requiring a change in the file access settings in order to prevent unauthorized access, modification or damage to data on the server.

Figures 1, 2:
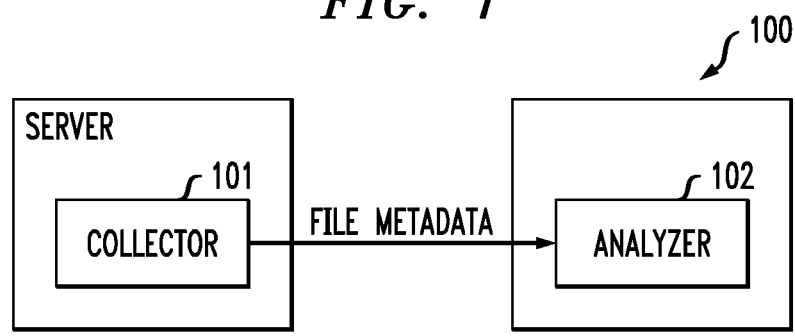
FIG. 1 is a diagram of a file system compliance checking system having decoupled collection and analysis components according to an exemplary embodiment of the present disclosure.
FIG. 2 is an exemplary snippet of code illustrating a parameterized throttling of a collection component according to an exemplary embodiment of the present disclosure.

According to an embodiment of the present invention, the split architecture (100, FIG. 1) separates the detector into two functionally distinct components: the collector 101 and the analyzer 102. According to an embodiment of the present invention, feedforward profiling and scheduling are used with a feedback control loop for individual and adaptive throttling of the collector component 101 (e.g., 200, FIG. 2) and the analyzer component 102. The collector component 101 produces a list of file meta-data of the file system (e.g., 300, FIG. 3), which is provided to the analyzer component 102 as shown in FIG. 1. The analyzer component 102 performs compliance checks against the collected file meta-data. The separation of the collector and analyzer removes code inter-dependency and allows the collector and the analyzer to be independently tuned for performance and resource consumption.

It should be understood that an adaptive system scanner implemented according to one or more embodiments of the present invention can perform a full file system scan for checking the compliance of an entire file system. The adaptive system scanner can be configured to perform a file system scan of less than an entire file system, e.g., scanning one or more files or directories provided by a user or as input from an application.

According to an embodiment of the present invention, both the collector and the analyzer are throttled with tunable parameters to reduce performance impacts (e.g., resource consumption) during the file system scan. For example, in an instance where the collector and the analyzer have different performance characteristics (e.g., the collector component is disk intensive, and the analyzer component is processor intensive), these different characteristics can be independently controlled using the tunable parameters. Processor and disk utilization are controllable characteristics useful in performance throttling and can be effective in meeting Service Level Objective requirements.

Additionally, the separate collector and analyzer components can separately evolve, reducing code maintenance. For example, compliance check code can be maintained independent of the file system scanning code. Furthermore, the analyzer component can be executed off-premise in a compute cluster, with zero resource utilization to a production system.

Figure 4:
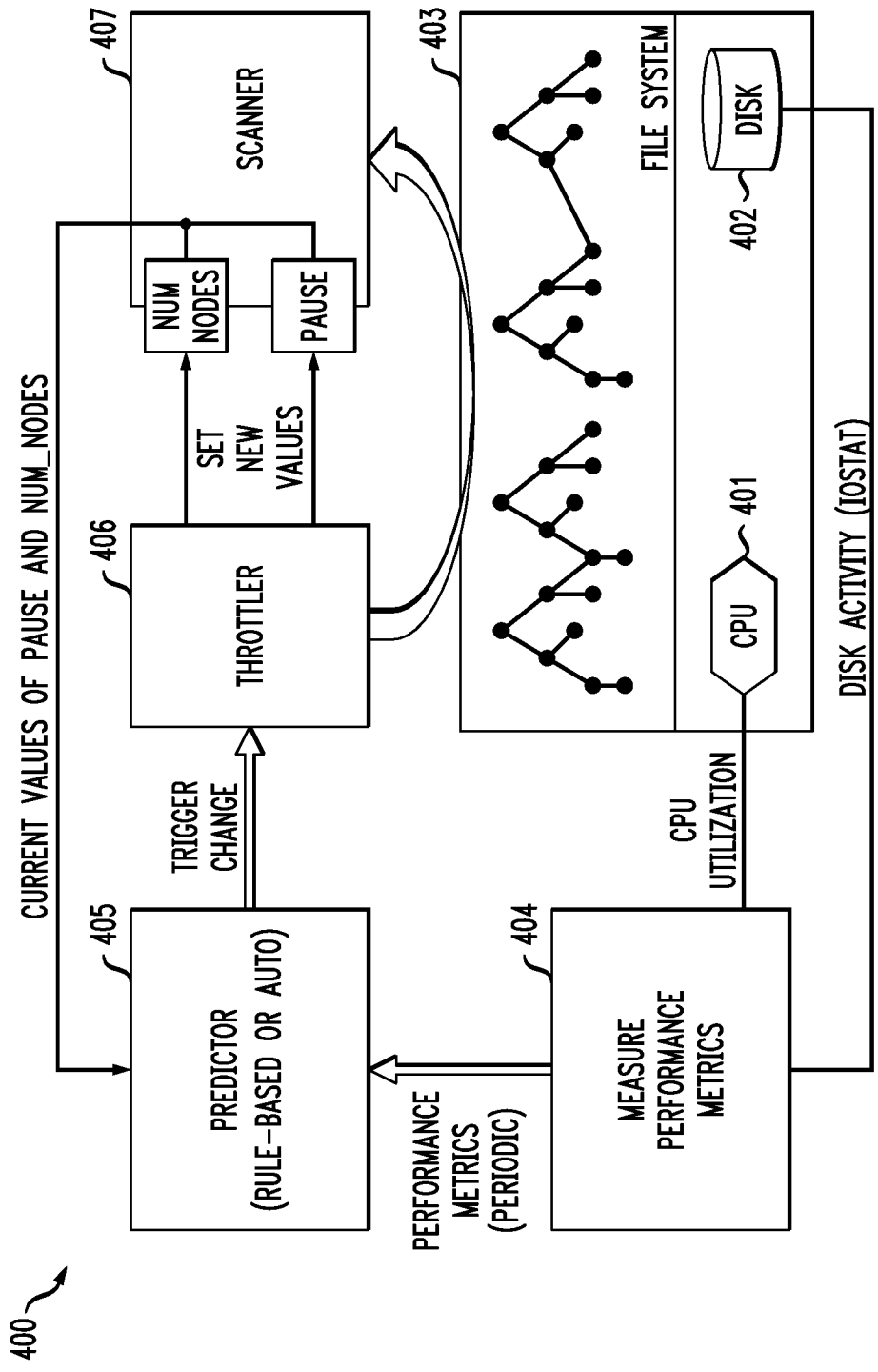
FIG. 4 is a flow diagram of a method for an adaptive file system scan according to an exemplary embodiment of the present disclosure.

Referring to FIG. 4, an adaptive system scanner 400 includes a processor 401 and memory 402, which stores a file system 403. The adaptive system scanner 400 includes sensors 404 that measure performance metrics of the processor 401 and memory 402. The performance metrics are output to a predictor 405, which can use machine learning methods (e.g., rule-based or automatic) to trigger change in a throttler 406. The throttler 406 sets parameters (e.g., pause and num-nodes) for controlling a scanner 407. In one exemplary embodiment, the scanner 407 is a recursive file system walker collecting inode or index node data. An inode is a data structure representing a file system object. The scanner 407 further informs the predictor 405 about a current parameter(s). The structure of the adaptive system scanner 400 is applicable to both the collector component and the analyzer component.

Figure 5:
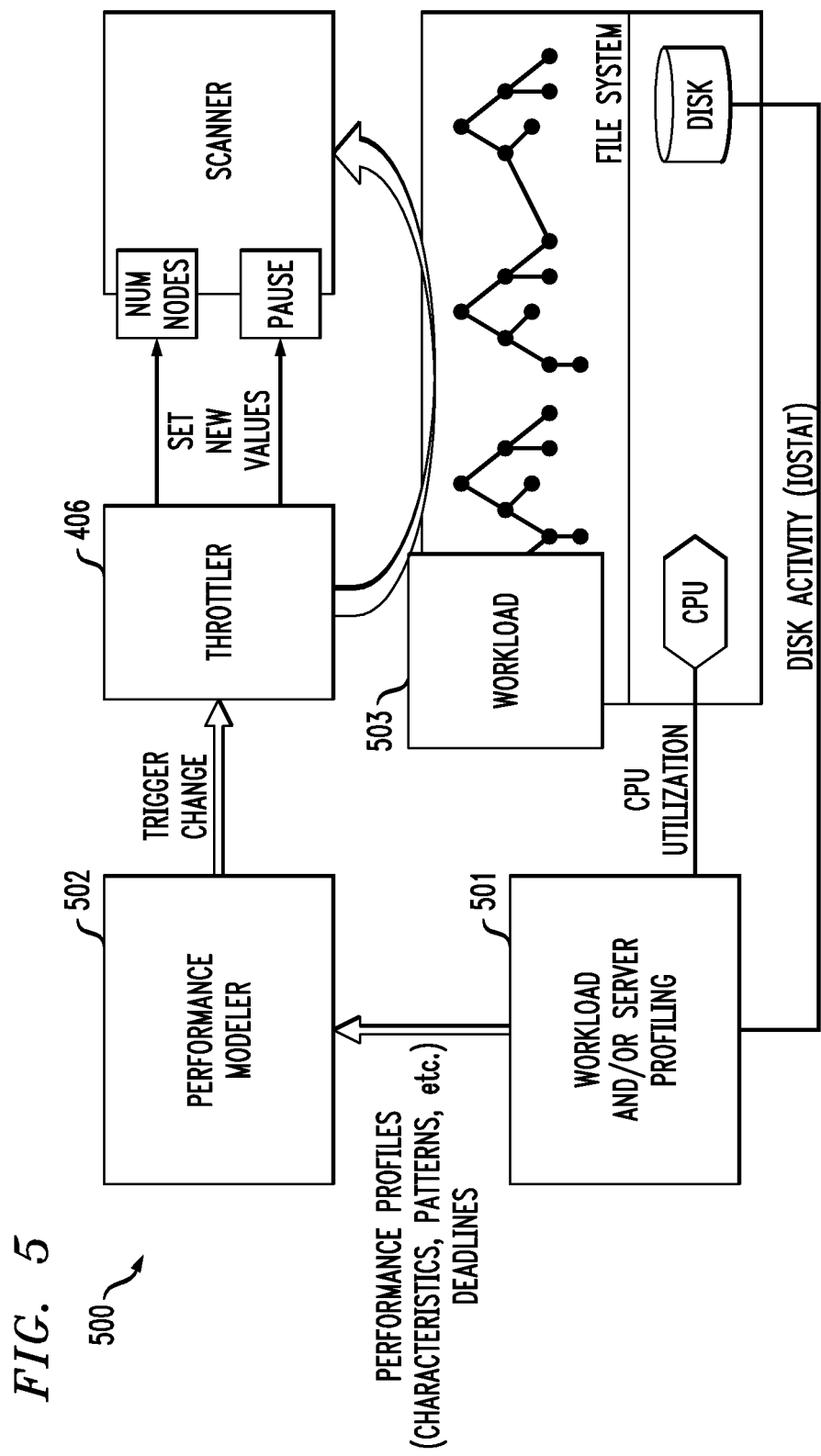
FIG. 5 is a flow diagram of a method for an adaptive file system scan having throttling with feedback according to an exemplary embodiment of the present disclosure.

Referring to FIG. 5, throttling with feedforward information can be implemented within the architecture of FIG. 4 using a workload and/or server profiling component 501 in place of the sensors 404. The workload and/or server profiling component 501 can use profiling tools to extract performance profiles (e.g., characteristics, patterns, etc.) and deadlines. A performance modeler 502 takes the extracted performance profiles and deadlines, and using a queuing model or ARMA models, triggers changes in the throttle 406. In FIG. 5, activity of a production system, such as a server, to be scanned is indicated as workload 503. That is, the workload includes the processing that the production system is intended to perform, for example, serving application programs, providing database services, communications services, game services and the like, question answering applications, etc.

Figure 6:
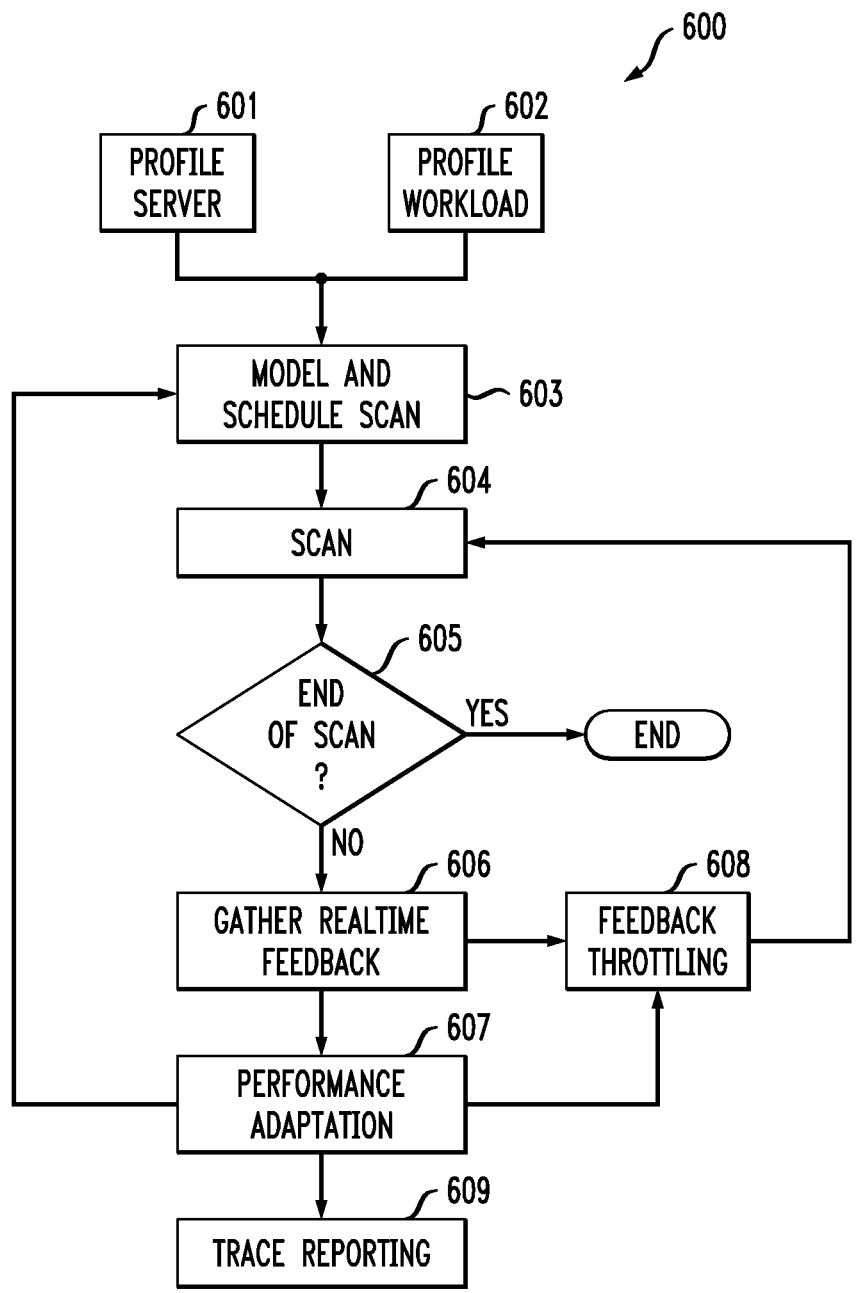
FIG. 6 is a flow diagram for collector scheduling and throttling through feedforward and feedback mechanisms according to an exemplary embodiment of the present disclosure.

Referring now to FIG. 6 and a method for collector scheduling and throttling through feedforward and feedback mechanisms 600, given a profile of the production system 601 (e.g., giving parameters for tolerances of the production system, such as time allotted for non-production workload and acceptable levels of processor performance) and profile workload 602 of the production system, a scan is modeled and scheduled at 603. The scan of the production system is initiated/performed at block 604, wherein file metadata is collected and compliance checks are performed against the collected file metadata.

Referring again to FIG. 3, the file metadata includes an indication of a file or directory's permissions, such as "-rw-rwx- - -" 301. In a UNIX file system this metadata indicates a file type "-" (where a dash - indicates a normal file and a d indicates a directory or folder), a user permission "rw-," a group permission "rwx," and a world permission "- - -." In the user, group and world permissions "r" indicates a read permission, "w" indicates a write permission, "x" indicates an execute permission and a dash "-" indicates that permission is not granted. One of ordinary skill in the art would recognize that exemplary embodiments of the present invention are applicable to other file system types and permissions. The file metadata can further include an indication of the user and group that the file belongs to, e.g., "perfmgr perfmgr" respectively, the size of the file in bytes (e.g., "1510"), the date and time the file was last modified, and the name of the file. It should be understood that the file metadata is not limited to the examples provided herein, and that other embodiments are contemplated.

The method determines whether the scan is complete at block 605, and if not gathers real-time feedback at block 606. The real-time feedback can include data about the performance of the production system, for example, the performance metrics of the processor 401 and memory 402. The real-time feedback is used in performance adaptation at block 607 (see also FIG. 4) and feedback throttling at block 608 (see also FIG. 5). In one or more embodiments, the performance adaptation at block 607 is based on application performance of the production workload (e.g., response time, throughput) to tune the workload schedule and feedback controller. The feedback throttling is used for controlling the scanning at block 604, while the performance adaption is used to control the modeling and scheduling of a subsequent scan at block 603. The method produces a trace report at block 609 using the performance adaptation. For example, the trace report can be a performance report (output) on the activity of the production system and/or the adaptive system scanner, and can be used to monitor performance for tuning the model and schedule of the adaptive system scanner over time to reduce perturbation on the production system.

FIG. 7 is an exemplary routine 700 for performing a collector method according to an exemplary embodiment of the present disclosure. The collector component 101 takes variables (see lines 1-4) including seconds to sleep, a number of files and directories to visit between sleep cycles, the name of a starting directory, and one or more rules directing the collector to skip zero or more files or directories. The collector outputs file system meta-data for the files and directories (see line 5). The collector component 101 performs a directory walk (see line 6), testing directory permissions (see line 9), recursively exploring all directories and files (see lines 10-17). As seen at lines 13 and 16 of FIG. 7, the collector component 101 can be configured to sleep, e.g., after performing a predetermined number of tasks or for a predetermined time.

Figure 8:
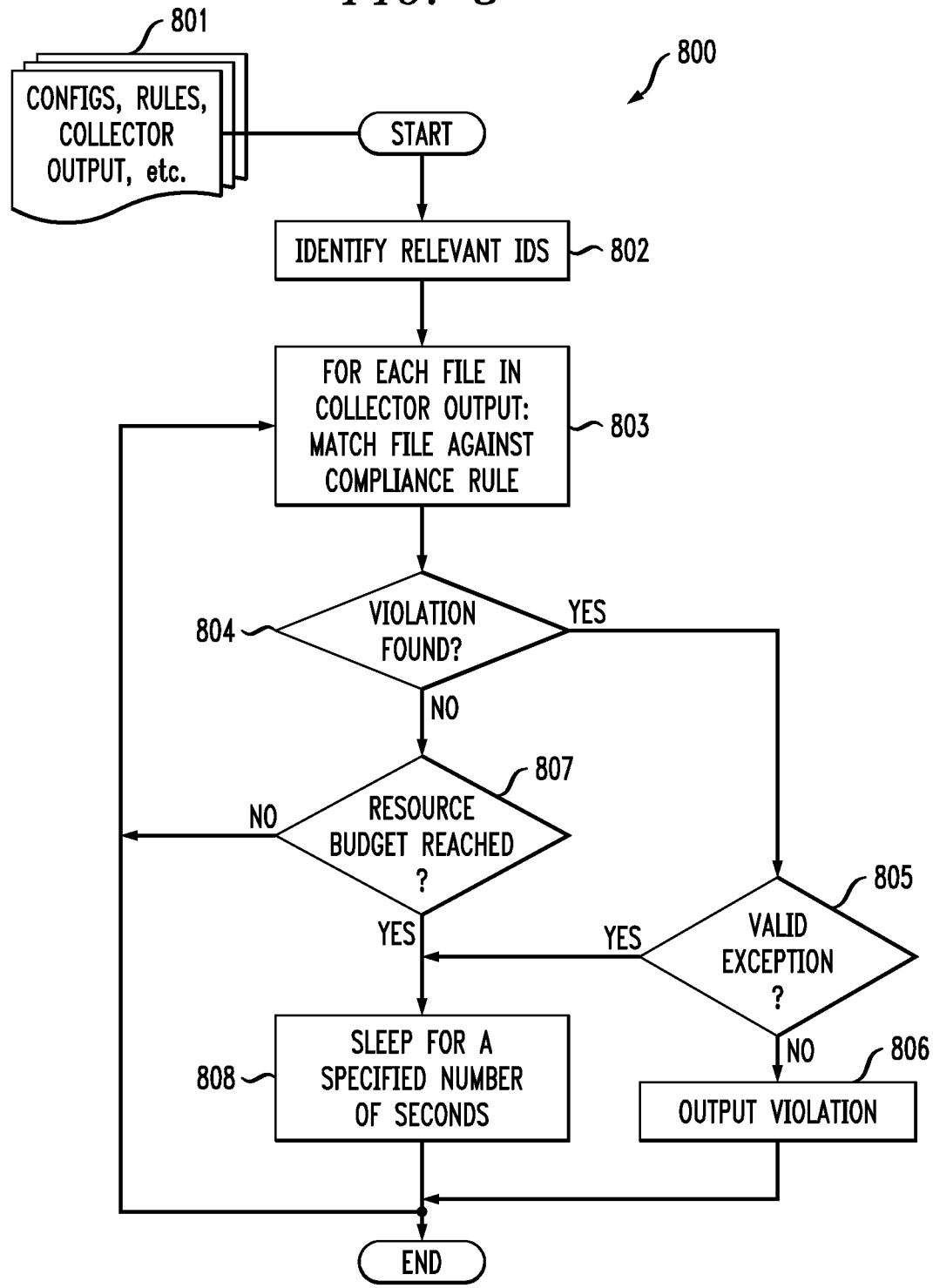
FIG. 8 is a flow diagram for performing an analysis method according to an exemplary embodiment of the present disclosure.

FIG. 8 is a flow diagram for performing an analysis method 800 according to an exemplary embodiment of the present disclosure. The analyzer component 102 as shown in FIG. 1 takes the output of the collector component 101, finds relevant identities at 802 (e.g., user identities or group identities with corresponding compliance rules), and matches each file in the collector output against the compliance rules at 803. For example, at 803, a record for a file or directory is compared against a list of access rules, (e.g., a rule can specify that files that are executable may not also have world write privileges). Based on the matching, the method determines whether a violation is found at 804, and if so, the method determines whether the violation is a valid exception at 805. A valid exception can be a file that has less restrictive file access rules than is considered good security practice, but needs to have those access rules in order for some software to function correctly. Other exceptions are possible. If the violation is not a valid exception, output is created (see block 806) and the method returns to the next file at 803 and otherwise ends. If at block 804, no violation is found, the method determines whether a resource budget is reached at 807, and if not the method returns to the next file at 803, otherwise the analyzer component 102 goes to sleep for a specified time at 808, returning to the next file at 803 and otherwise ending.

It should be understood that the collector component 101 and the analyzer component 102 are independently operated to sleep for periods and intervals configured to reduce perturbation to the computer system being scanned.

Figure 9:
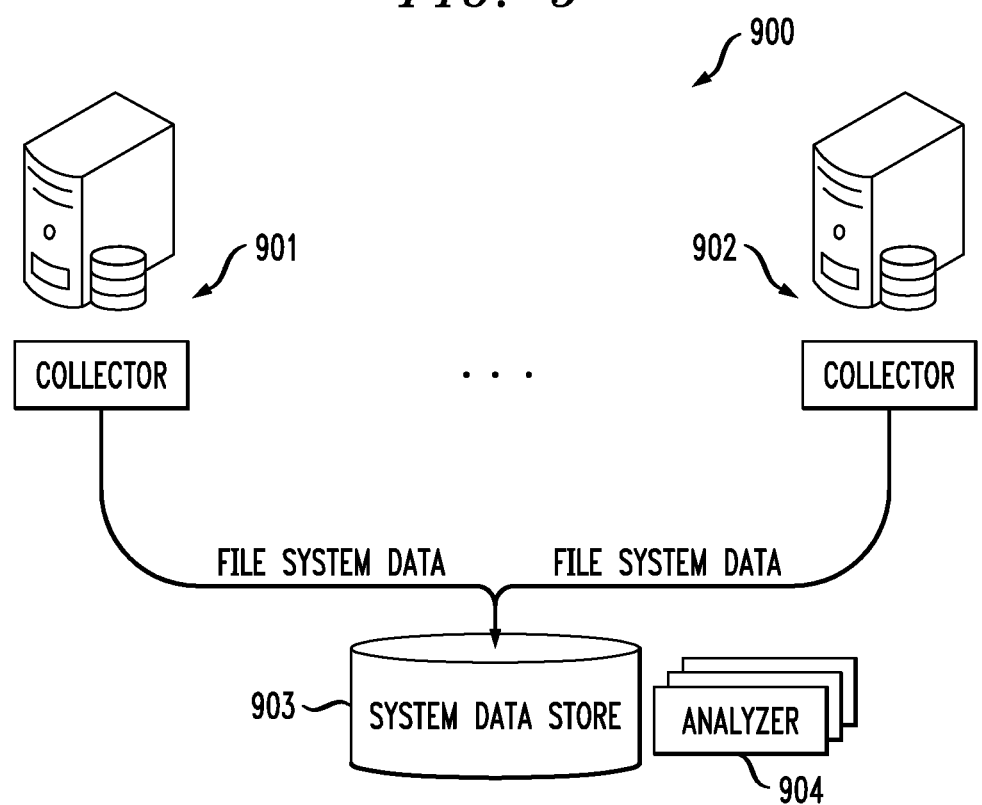
FIG. 9 is a diagram of a system configured for off-premises compliance checking according to an exemplary embodiment of the present disclosure.

FIG. 9 is a diagram of a system 900 configured for off-premises compliance checking according to an exemplary embodiment of the present disclosure. In FIG. 9, a plurality of collectors 901, 902 are disposed in separate computer systems local to one or more production systems. Each collector 901, 902 writes file system data (e.g., file metadata) to a shared system data store 903. An analyzer component 904 is implemented at the system data store 903 for analyzing the file system data received from the collectors 901, 902.

Figure 10:
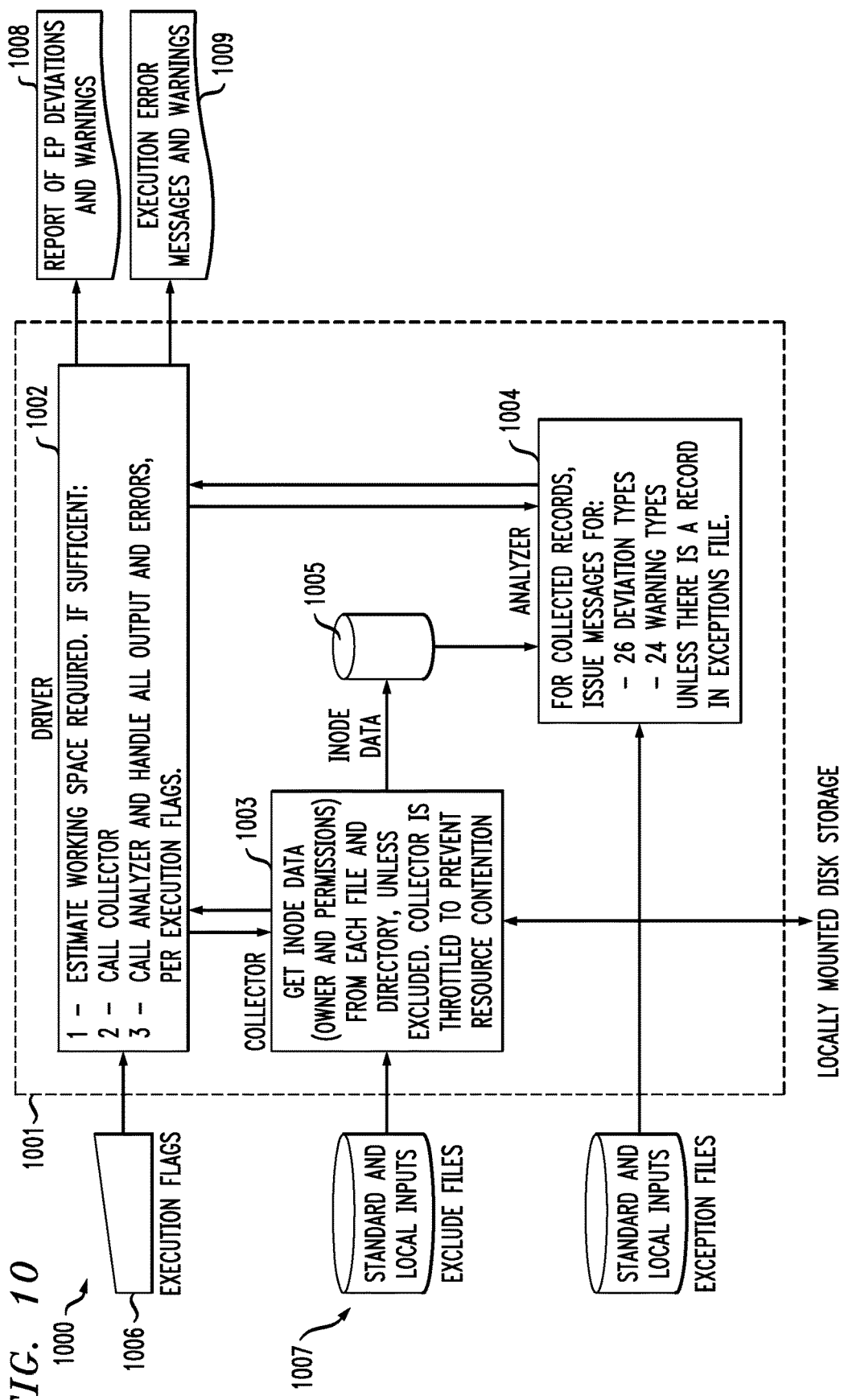
FIG. 10 is a diagram of a flow diagram for file system compliance checking according to an exemplary embodiment of the present disclosure.

FIG. 10 is a diagram of a flow diagram 1000 of system usage for file system compliance checking according to an exemplary embodiment of the present disclosure. A system 1001 includes a driver 1002, collector 1003, analyzer 1004 and storage device 1005. The driver 1002 is a software program taking execution flags from the file system 1006, estimating a working space need to process the file system, calling the collector and analyzer, and handling all output and errors for each execution flag. The collector 1003 collects inode data from each file and directory, unless the file of directory is excluded (e.g., as indicating in one or more database of inputs 1007). The collector 1003 outputs the inode data to the storage device 1005, which can be accessed by the analyzer 1004. The analyzer 1004 takes the inode data and for the collected records, issues messages for different deviation types and warning types, unless there is a records in an exceptions file (e.g., as indicating in one or more database of inputs 1007). The driver 1002, communicating with the collector 1003 and the analyzer 1004, outputs a report of deviations and warnings 1008 and execution error messages and warnings 1009.

By way of recapitulation, according to an exemplary embodiment of the present invention, given Service Level Objectives (e.g., placing limits on disk and processor utilization), meta-data is collected for each file of a file system, and the meta-data is analyzed for each file against compliance rules. The file system scan can be done in a variety of ways (e.g., the scan execution can be performed sequentially for each file or directory or in parallel (e.g., using concurrent threads). And for either style (sequential or parallel), decisions about throttling are made for a collector component and an analyzer component. For example, a collector component can be paused after scanning all files/directories in a directory, after reading X KB of inode-data, after reading N inodes, after every Y seconds, etc.

According to an exemplary embodiment of the present invention, parameters are selected by the driver (see FIG. 10), wherein system metrics are selected for measuring disk and processor utilization, indicator values (e.g., for iowait (input/output wait time), tm_act (time a system is busy), and Kbps and found Kbps) are selected for each disk to be explored, for polling (e.g., by a processor) at specific intervals (e.g., every 30 seconds) over a predetermined period (e.g., 1 hour) (e.g., using a "top" tool).

According to an exemplary embodiment of the present invention, throttling parameters are selected via a parameter sensitivity analysis for various combinations of the parameters. For example, parallel scanning is associated with heavy processor/disk utilization as compared to sequential scanning.

According to an exemplary embodiment of the present invention, the adaptive throttling methods can be enhanced using, for example, workload profiling, server profiling, performance modeling, a queuing model or an Autoregressive-Moving Average (ARMA) model, workload scheduling, feedback throttling, performance adaption, trace reporting, etc.

In one or more embodiments, the workload profiling (see 602, FIG. 6) includes, for example, determining IO/processor workload intensity, deadline(s) to finish a scan, etc. Server profiling (see 601, FIG. 6) can include, for example, getting a weekly pattern of production workload (e.g., IO and processor bound workload) to determine one or more windows to insert non-production work, such as scanning. In one or more embodiments, the performance modeling (see 603, FIG. 6) includes determining a size of the window in terms of the width (time) and depth (IO/processor tolerance of the production system). The queuing model or the ARMA model can include, for example, understanding how much additional non-production workload (e.g., scanning) can take place without affecting the production workload, for example, 9-10 weekday (5% more processor, 10% more IO), 10-12 weekday (10% more processor, 15% more IO)). The workload scheduling (see 603, FIG. 6) can include fitting the scanning to a deadline (e.g., there are various constraints, such as a schedule to be met (i.e., this scan must be at least 20 minutes and cannot be broken to pieces, or precedence (i.e., this scan must occur before the other scan). In one or more embodiments, the feedback throttling (see 608, FIG. 6) uses tuning parameters (e.g., sleep time, number of nodes) to satisfy processor and IO requirements of the production system. In one or more embodiments, the performance adaption (see 607, FIG. 6) is based on the application performance metrics (e.g., response time, throughput), to tune the workload scheduler and feedback controller. The trace reporting (see 609, FIG. 6) can show the performance log to the owner, for auditing/decision making purposes.

The methodologies of embodiments of the disclosure may be particularly well-suited for use in an electronic device or alternative system. Accordingly, embodiments of the present disclosure may take the form of an entirely hardware embodiment or an embodiment combining software and hardware aspects that may all generally be referred to herein as a "processor," "circuit," "module" or "system." Furthermore, embodiments of the present disclosure may take the form of a computer program product embodied in one or more computer readable storage medium(s) having computer readable program code stored thereon.

Furthermore, it should be noted that any of the methods described herein can include an additional step of providing a system for scanning a file system of a production system using feedforward profiling and scheduling with feedback for individual and adaptive throttling (see for example, FIG. 1) comprising distinct software modules embodied on one or more tangible computer readable storage media. All the modules (or any subset thereof) can be on the same medium, or each can be on a different medium, for example. The modules can include any or all of the components shown in the figures.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 11:
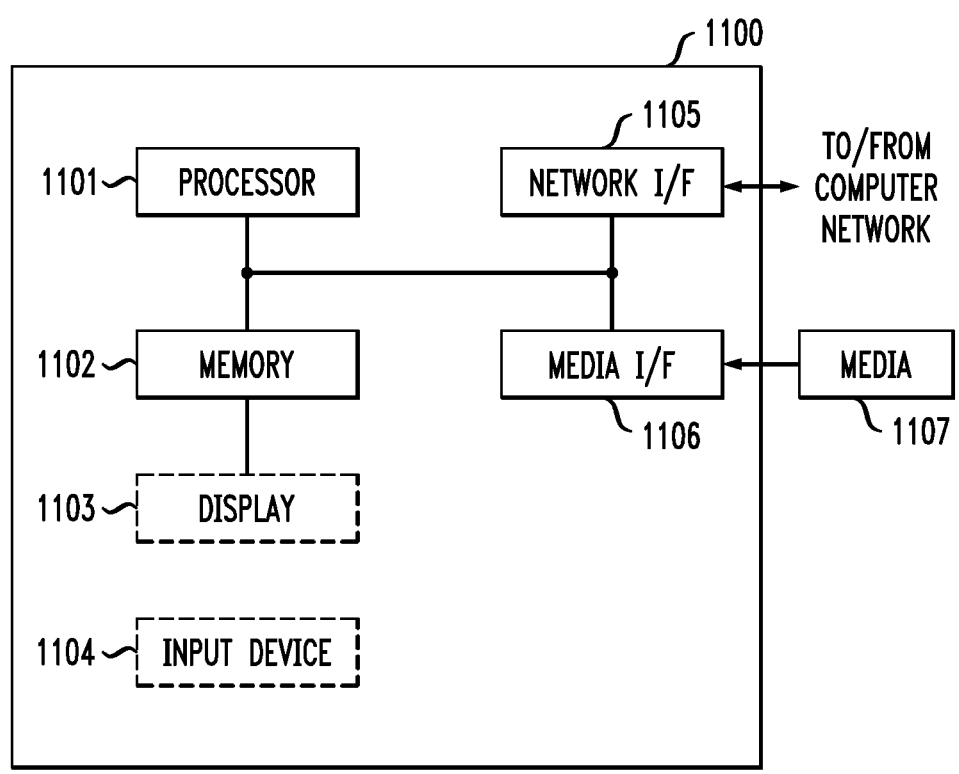
FIG. 11 is a diagram of a computer system configured for file system compliance checking according to an exemplary embodiment of the present disclosure.

For example, FIG. 11 is a block diagram depicting an exemplary computer system for scanning a file system using feedforward profiling and scheduling with feedback for individual and adaptive throttling according to an embodiment of the present disclosure. The computer system can be the production system itself including an adaptive system scanner or a stand-alone adaptive system scanner connected to an independent production system. The computer system shown in FIG. 11 includes a processor 1101, memory 1102, display 1103, input device 1104 (e.g., keyboard), a network interface (I/F) 1105, a media IF 1106, and media 1107, such as a signal source, e.g., camera, Hard Drive (HD), external memory device, etc.

In different applications, some of the components shown in FIG. 11 can be omitted. The whole system shown in FIG. 11 is controlled by computer readable instructions, which are generally stored in the media 1107. The software can be downloaded from a network (not shown in the figures), stored in the media 1107. Alternatively, a software downloaded from a network can be loaded into the memory 1102 and executed by the processor 1101 so as to complete the function determined by the software.

The processor 1101 may be configured to perform one or more methodologies described in the present disclosure, illustrative embodiments of which are shown in the above figures and described herein. Embodiments of the present disclosure can be implemented as a routine that is stored in memory 1102 and executed by the processor 1101 to process the signal from the media 1107. As such, the computer system is a general-purpose computer system that becomes a specific purpose computer system when executing the routine of the present disclosure.

Although the computer system described in FIG. 11 can support methods according to the present disclosure, this system is only one example of a computer system. Those skilled of the art should understand that other computer system designs can be used to implement the present invention.

Although illustrative embodiments of the present disclosure have been described herein with reference to the accompanying drawings, it is to be understood that the disclosure is not limited to those precise embodiments, and that various other changes and modifications may be made therein by one skilled in the art without departing from the scope of the appended claims.

What is claimed is:

1. A method of checking file system compliance comprising:
   receiving a plurality of compliance rules corresponding to a file system of a production system operating and a performance profile for processor and disk utilization within the production system;
   collecting, by a collector operating according to a model of performance, file system meta data from the file system, the collector storing the file system meta data in a storage device, wherein the collection consumes resources of the production system;
   analyzing, by an analyzer according to the model of performance, the file system meta data stored in the storage device using the plurality of compliance rules to determine at least one compliance deviation of the file system;
   profiling the processor and disk utilization of the production system during the collection and the analysis;
   throttling, in response to the processor and disk utilization of the production system during the collection and analysis and the performance profile for the processor and disk utilization, the collector and the analyzer independently of one-another; and
   adjusting the model of performance including a schedule for each of the collection and the analyzing, and a maximum number of nodes of the file system that can be read by the collector before a pause of the collection, in response to the profiling of the processor and disk utilization of the production system.

2. The method of claim 1, further comprising receiving at least one parameter defining a window of time available to one or more of the collector and the analyzer consuming resources of the production system, wherein the window of time is included in the schedule.

3. The method of claim 1, further comprising receiving at least one parameter defining tolerances for a level of performance of the processor and disk utilization of the production system during the collecting and the analyzing.

4. The method of claim 3, wherein the throttling of the collector and the analyzer is performed in response to the level of performance of the processor and disk utilization of the production system during the collecting and the analyzing.

5. The method of claim 3, further comprising producing a trace report for the level of performance of the production system.

6. The method of claim 1, wherein the independent throttling of the collector and the analyzer is performed using respective and independent sleep cycles of the collector and the analyzer such that independent requirements for the processor and disk utilization of the production system are satisfied.

7. A computer program product for checking file system compliance, the computer program product comprising a computer readable storage medium having program instructions embodied therewith, the program instructions executable by a processor to cause the processor to perform a method comprising:
   receiving a plurality of compliance rules corresponding to a file system of a production system operating and a performance profile of the production system;
   collecting, by a collector operating according to a model of performance, file system meta data from the file system, the collector storing the file system meta data in a storage device, wherein the collection consumes resources of the production system;
   analyzing, by an analyzer according to the model of performance, the file system meta data stored in the storage device using the plurality of compliance rules to determine at least one compliance deviation of the file system;
   profiling at least one parameter of the production system during the collecting and the analyzing;
   throttling, in response to the at least one parameter of the production system and the performance profile, the collector and the analyzer independently of one-another; and
   adjusting the model of performance including a schedule for each of the collection and the analyzing, and a maximum number of nodes of the file system that can be read by the collector before a pause of the collection, in response to profiling of the least one parameter of the production system.

8. The computer program product of claim 7, wherein the at least one parameter defines a window of time available to one or more of the collector and the analyzer consuming resources of the production system, wherein the window of time is included in the schedule.

9. The computer program product of claim 7, wherein the at least one parameter defines tolerances for a level of performance of the production system during the collecting and the analyzing.

10. The computer program product of claim 9, wherein the throttling of the collector and the analyzer is performed in response to the level of performance of the production system during the collecting and the analyzing.

11. The computer program product of claim 10, further comprising producing a trace report for the level of performance of the production system.

12. The computer program product of claim 7, wherein the independent throttling of the collector and the analyzer is performed using respective and independent sleep cycles of the collector and the analyzer such that independent requirements for the processor and disk utilization of the production system are satisfied.

13. A system configured for checking file system compliance comprising:
   a production system comprising a processor and a memory;
   an analyzer comprising a system data store; and
   at least one collector disposed remote from the system data store and configured to operate according to a model of performance including a value for each of a maximum number of nodes of the file system that can be read by the collector before a pause of the collector, and a schedule for the collection of the file system data, each collector gathering file system data from the production system and storing the file system data at the system data store,
   wherein the analyzer is configured to operate according to the model of performance and analyze the file system meta data using a plurality of compliance rules corresponding to the production system to determine at least one compliance deviation,
   wherein the at least one collector is throttled, independently of the analyzer, in response to a performance metric of the production system and a performance profile of the production system, and
   wherein the collector and the analyzer consume resources of the production system.

* * * * *